US008836838B2

(12) United States Patent
Nakamura et al.

(10) Patent No.: US 8,836,838 B2
(45) Date of Patent: Sep. 16, 2014

(54) SOLID-STATE IMAGING APPARATUS AND METHOD OF DRIVING THE SAME

(75) Inventors: Kohichi Nakamura, Kawasaki (JP); Hiroki Hiyama, Sagamihara (JP); Tetsuya Itano, Sagamihara (JP); Kazuhiro Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 13/586,956

(22) Filed: Aug. 16, 2012

(65) Prior Publication Data

US 2013/0057742 A1 Mar. 7, 2013

(30) Foreign Application Priority Data

Sep. 5, 2011 (JP) .................. 2011-192717

(51) Int. Cl.
*H04N 3/14* (2006.01)
*H04N 5/378* (2011.01)
*H04N 5/359* (2011.01)

(52) U.S. Cl.
CPC ............. *H04N 5/378* (2013.01); *H04N 5/3598* (2013.01)
USPC ........................................................ 348/308

(58) Field of Classification Search
USPC ........................................................ 348/308
See application file for complete search history.

(56) References Cited

U.S. PATENT DOCUMENTS

| | | | |
|---|---|---|---|
| 6,188,094 B1 | 2/2001 | Kochi et al. | 257/232 |
| 6,670,990 B1 | 12/2003 | Kochi et al. | 348/310 |
| 6,873,363 B1 | 3/2005 | Barna et al. | 348/308 |
| 6,960,751 B2 | 11/2005 | Hiyama et al. | 250/208.1 |
| 7,110,030 B1 | 9/2006 | Kochi et al. | 348/308 |
| 7,126,102 B2 | 10/2006 | Inoue et al. | 250/214 R |
| 7,187,052 B2 | 3/2007 | Okita et al. | 257/444 |
| 7,283,305 B2 | 10/2007 | Okita et al. | 359/619 |
| 7,321,110 B2 | 1/2008 | Okita et al. | 250/208.1 |
| 7,429,764 B2 | 9/2008 | Koizumi et al. | 257/292 |
| 7,462,810 B2 | 12/2008 | Kobayashi et al. | 250/208.1 |
| 7,528,878 B2 | 5/2009 | Sano et al. | 348/317 |
| 7,538,804 B2 | 5/2009 | Okita et al. | 348/241 |
| 7,557,847 B2 | 7/2009 | Okita et al. | 348/308 |
| 7,592,579 B2 | 9/2009 | Tamura et al. | 250/208.1 |
| 7,638,826 B2 | 12/2009 | Hiyama et al. | 257/291 |
| 7,719,587 B2 | 5/2010 | Ogura et al. | 348/302 |
| 7,741,593 B2 | 6/2010 | Iwata et al. | 250/214 R |
| 7,755,688 B2 | 7/2010 | Hatano et al. | 348/300 |
| 7,812,873 B2 | 10/2010 | Hiyama et al. | 348/294 |

(Continued)

FOREIGN PATENT DOCUMENTS

| | | |
|---|---|---|
| JP | 2006-081203 A | 3/2006 |
| JP | 2008-259228 A | 10/2008 |
| JP | 2009-177436 A | 8/2009 |

*Primary Examiner* — James Hannett
(74) *Attorney, Agent, or Firm* — Fitzpatrick, Cella, Harper & Scinto

(57) ABSTRACT

A solid-state imaging apparatus includes a plurality of pixels arranged two-dimensionally in a matrix, a reference signal generating circuit adapted to generate a ramp signal, a counter circuit adapted to perform a counting operation according to output of the ramp signal, comparators arranged on a column by column basis and adapted to compare signals read out of the pixels with the ramp signal, and memories arranged on a column by column basis and adapted to store digital data, wherein if output of the comparator is not changed during an AD conversion period, digital data of a predetermined value is stored in the memory. The solid-state imaging apparatus implements overflow handling using a simplified circuit configuration.

11 Claims, 4 Drawing Sheets

(56) References Cited

U.S. PATENT DOCUMENTS

| | | | |
|---|---|---|---|
| 7,812,876 B2 | 10/2010 | Hiyama et al. | 348/300 |
| 7,825,974 B2 | 11/2010 | Itano et al. | 348/308 |
| 7,920,192 B2 | 4/2011 | Watanabe et al. | 348/308 |
| 7,982,789 B2 | 7/2011 | Watanabe et al. | 348/308 |
| 8,023,025 B2 | 9/2011 | Itano et al. | 348/308 |
| 8,045,034 B2 | 10/2011 | Shibata et al. | 348/308 |
| 8,081,245 B2 | 12/2011 | Itano et al. | 348/301 |
| 8,085,319 B2 | 12/2011 | Ono et al. | 348/241 |
| 8,106,955 B2 | 1/2012 | Okita et al. | 348/220.1 |
| 8,120,686 B2 | 2/2012 | Hatano et al. | 348/308 |
| 8,159,577 B2 | 4/2012 | Iwata et al. | 348/296 |
| 8,208,055 B2 | 6/2012 | Hiyama | 348/300 |
| 8,218,050 B2 | 7/2012 | Ogura et al. | 348/308 |
| 8,289,431 B2 | 10/2012 | Itano | 348/308 |
| 8,310,581 B2 * | 11/2012 | Itakura et al. | 348/308 |
| 8,325,260 B2 | 12/2012 | Yamazaki et al. | 348/308 |
| 2006/0012698 A1 * | 1/2006 | Nitta et al. | 348/308 |
| 2006/0170803 A1 | 8/2006 | Lim | 348/308 |
| 2007/0023788 A1 * | 2/2007 | Yasui et al. | 257/239 |
| 2009/0219424 A1 | 9/2009 | Sonoda et al. | 348/302 |
| 2009/0322922 A1 | 12/2009 | Saito et al. | 348/308 |
| 2010/0060762 A1 | 3/2010 | Takada et al. | 348/300 |
| 2010/0295978 A1 | 11/2010 | Nakamura et al. | 348/273 |
| 2011/0254986 A1 * | 10/2011 | Nishimura et al. | 348/302 |
| 2012/0026371 A1 | 2/2012 | Itano et al. | 348/301 |

* cited by examiner

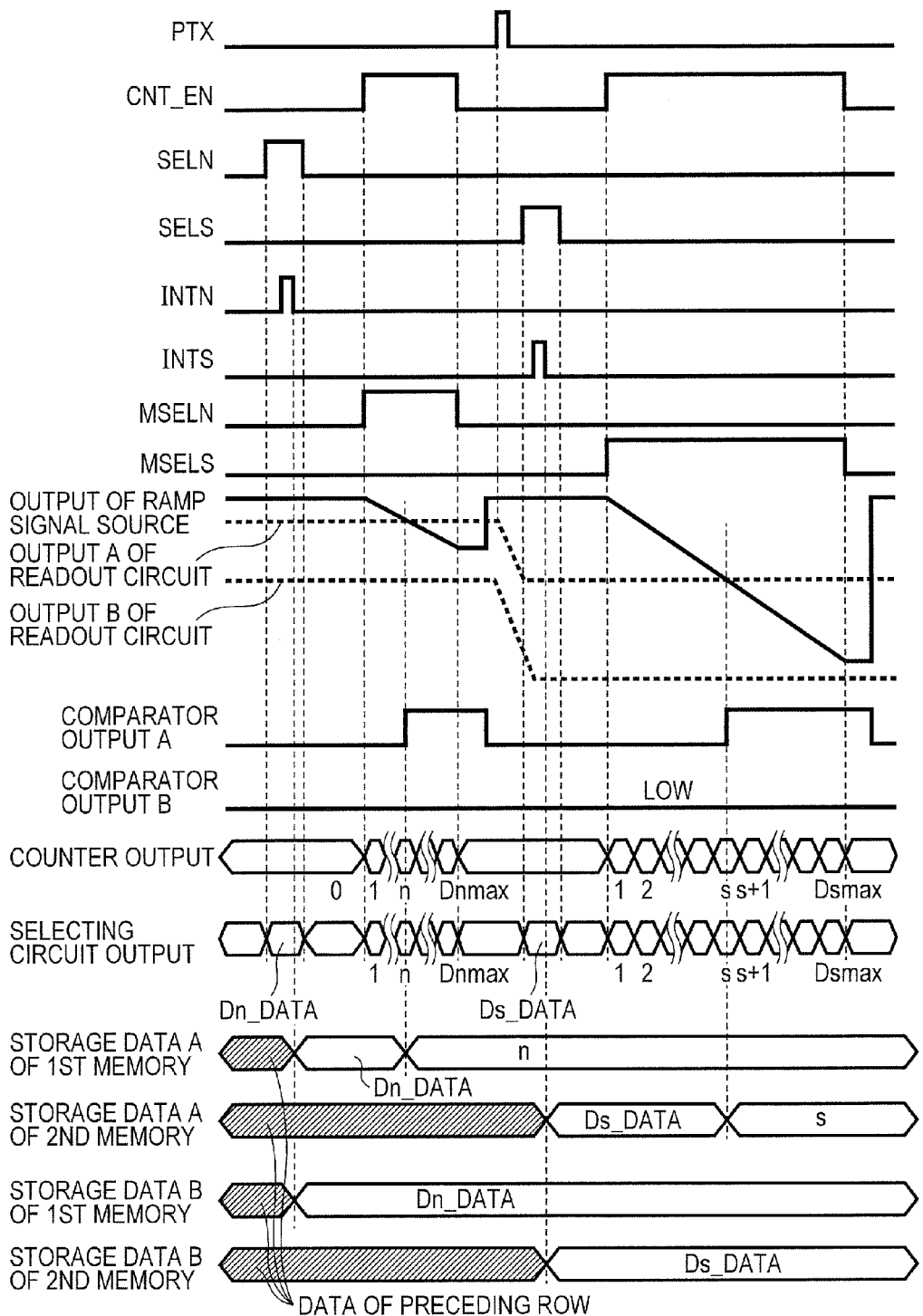

SOLID-STATE IMAGING APPARATUS AND METHOD OF DRIVING THE SAME

BACKGROUND OF THE INVENTION

1. Field of the Invention

The present invention relates to a solid-state imaging apparatus and a method of driving the solid-state imaging apparatus.

2. Description of the Related Art

Recently, solid-state imaging apparatus such as CMOS image sensors have come to be used widely for digital cameras, digital camcorders, camera units of cell phones, and the like. Due to demand for reductions in the number of parts and in power consumption, studies are conducted on solid-state imaging apparatus with built-in analog/digital conversion circuits (AD conversion circuits or ADCs). As a form of ADC, there is a type called a column ADC in which an A/D conversion circuit is installed for each column of a pixel array. Of this type, a ramp column ADC, for example, is known well. The ramp column ADC includes a ramp signal source, and comparators installed on a column by column basis. The ramp column ADC compares each pixel signal with a ramp signal (reference signal) from the ramp signal source using the corresponding comparator, measures the time required for magnitude relationship between electric potential of the pixel signal and electric potential of the ramp signal to reverse, and stores digital data corresponding to the time in memory.

For example, Japanese Patent Application Laid-Open No. 2008-259228 describes a configuration of a column ADC in which an up/down counter is placed for each column. According to a technique disclosed in Japanese Patent Application Laid-Open No. 2008-259228, in converting standard signals output from pixels from analog to digital, counting is performed in one of Up-count and Down-count modes. On the other hand, in converting pixel signals output from pixels from analog to digital, counting is performed in the other of Up-count and Down-count modes.

Also, Japanese Patent Application Laid-Open No. 2006-081203 describes a configuration of a column ADC in which a counter is placed for each column. If there are large potential differences between the ramp signal and standard signals or pixel signals, a comparison process will not finish within a predetermined AD conversion period, which could result in a so-called overflow. According to the configuration described in Japanese Patent Application Laid-Open No. 2006-081203, if signal values of signals output from comparators in case of an overflow do not change, after time-dependent changes in the signal value of the ramp signal are finished, a signal instructing a count signal to be held in memory is output to memory.

SUMMARY OF THE INVENTION

In order to perform overflow handling, extra bits for overflow or carry bits are provided in a solid-state imaging apparatus described in Japanese Patent Application Laid-Open No. 2008-259228. However, the overflow handling requires at least one bit per column to be added to a circuit. This complicates the circuit, and thus reduction in circuit area cannot be expected. The solid-state imaging apparatus described in Japanese Patent Application Laid-Open No. 2008-259228 provides an AND circuit and OR circuit for each column, and thus has a problem of increased circuit scales.

An object of the present invention is to provide a solid-state imaging apparatus and a method of driving the solid-state imaging apparatus which can implement overflow handling while curbing increases in circuit scales.

According to one aspect of the present invention, a solid-state imaging apparatus comprising: a plurality of pixels arranged two-dimensionally in a matrix, and each outputting a pixel signal; a reference signal generating circuit configured to generate a reference signal that changes monotonously with time; a plurality of comparators each arranged corresponding to each of columns of the plurality of pixels, and configured to compare the pixel signal with the reference signal; a plurality of memories arranged each correspondingly to each of the plurality of comparators; a counter starting a counting operation according to an output of the reference signal from the reference signal generating circuit, configured to count clock pulses to generate a count signal and configured to supply the count signal to the plurality of memories; and a data supplying unit configured to supply digital data of a predetermined value to the plurality of memories.

According to another aspect of the present invention, a method of driving a solid-state imaging apparatus comprising: a plurality of pixels arranged two-dimensionally in a matrix, and each outputting a pixel signal; a plurality of comparators each arranged corresponding to each of columns of the plurality of pixels, and configured to compare the pixel signal with the reference signal; a plurality of memories arranged each correspondingly to each of the plurality of comparators; and a counter starting a counting operation according to an output of the reference signal from the reference signal generating circuit, configured to count clock pulses to generate a count signal and configured to supply the count signal to the plurality of memories, wherein the method comprising steps of: writing digital data of the predetermined value to the plurality of memories before the comparing the pixel signal with the reference signal, and renewing a data of the plurality of memories from the digital data written into the signal value of the count signal when a signal value expressed a result of the comparing is changed.

According to the present invention, if the signal value of the signal output by the comparator based on result of comparison do not change during the period in which the comparator perform comparison operation, digital data of predetermined value has been stored in the memory adapted to store digital data corresponding to signal read out of the pixel. This allows overflow handling to be implemented while curbing increases in circuit scales.

Further features of the present invention will become apparent from the following description of exemplary embodiments with reference to the attached drawings.

BRIEF DESCRIPTION OF THE DRAWINGS

FIG. 4 is a timing chart illustrating another exemplary operation of the solid-state imaging apparatus.

DESCRIPTION OF THE EMBODIMENTS

Preferred embodiments of the present invention will now be described in detail in accordance with the accompanying drawings.

Embodiments of the present invention will be described below with reference to the drawings.

A first embodiment of the present invention will be described.

Figure 1:
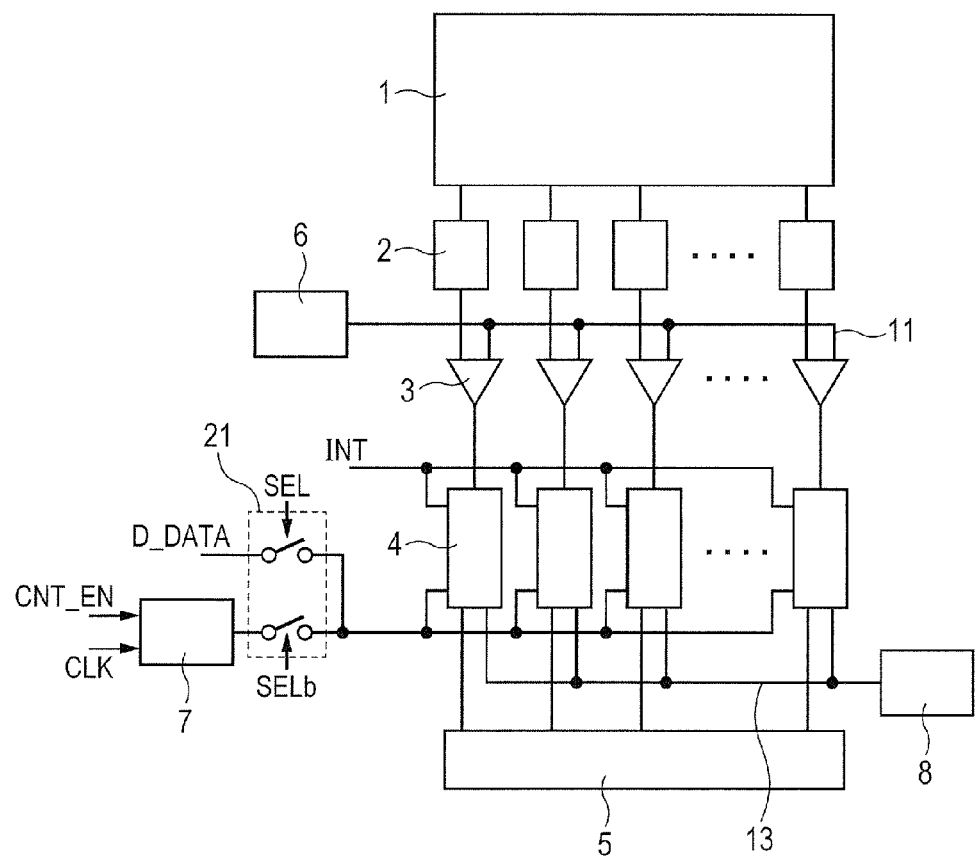
FIG. 1 is a diagram showing an exemplary configuration of a solid-state imaging apparatus.

FIG. 1 is a schematic diagram showing an exemplary circuit configuration of a solid-state imaging apparatus according to the first embodiment. The solid-state imaging apparatus according to the first embodiment includes a pixel unit 1, read out circuits 2, comparators 3, memories 4, a horizontal scanning circuit 5, a ramp signal source (reference signal generating circuit) 6, a counter circuit 7, a signal processing circuit 8 and a selection circuit 21. The pixel unit 1 includes a plurality of pixels containing a photoelectric conversion element with the pixels being arranged two-dimensionally (in row and column directions) in a matrix. The read out circuits 2, comparators 3, and memories 4 are arranged on a column by column basis in the pixel unit 1 with one each of them provided for each column. The read out circuits 2, comparators 3, and memories 4 provided on a column by column basis make up an analog/digital conversion circuit adapted to convert pixel signals produced by the pixels of the pixel unit 1 from analog to digital. The read out circuits 2 output the pixel signals read out of the pixel unit 1.

The comparators 3 accept, as input, output from the read out circuits 2 and a ramp signal generated by the ramp signal source 6 and supplied via a ramp line 11. Each comparator 3 compares the magnitude of the potential between a signal which is output from the corresponding read out circuit 2 and the ramp signal and outputs either a High signal or Low signal based on a result of comparison. Therefore, the comparator 3 changes its output from High to Low or from Low to High when magnitude relationship between the electric potential of the signal which is output from the read out circuit 2 and the electric potential of the ramp signal reverses.

The memories 4 accept as input the outputs from the respective comparators 3, a write enable pulse INT, and an output from the selection circuit 21. Each of the memories 4 stores the output from the selection circuit 21 as digital data at the instant when the potential of the output from the corresponding comparator 3 is reversed or the instant when the write enable pulse INT changes from High to Low. The digital data stored in the memories 4 is transferred serially to the signal processing circuit 8 on a column by column basis at a signal from the horizontal scanning circuit 5 and subjected to a computational process, as required, by the signal processing circuit 8.

The ramp signal source (reference signal generating circuit) 6 is connected in common to a plurality of comparators 3 and is adapted to generate a ramp signal as a reference signal. The ramp signal is a signal which changes its signal level (signal intensity) monotonically with time, for example, a signal which monotonically increases or decreases its output potential with time. The monotonic decrease here may be not only a continuous decrease in electric potential over time, but also stepwise decreases in electric potential as long as there is no increase from the value at any earlier time. This applies similarly to the monotonic increase. The monotonic decreases and monotonic increases will be referred to collectively as monotonic changes.

The counter circuit 7 is connected in common to a plurality of memories 4. The counter circuit 7 accepts as input a clock CLK used to generate a count signal and a counter operation enable pulse CNT_EN. When the counter operation enable pulse CNT_EN is High, the counter circuit performs a counting operation using the clock CLK and outputs a count signal. On the other hand, when the counter operation enable pulse CNT_EN is Low, the counter circuit 7 outputs a signal value of "0" as a count signal without performing a counting operation.

The selection circuit 21 accepts, as input, digital data D_DATA of a predetermined value and the output of the counter circuit 7. Based on selection pulses SEL and SELb, the selection circuit 21 can select which to output, the digital data D_DATA or the count signal which is output from the counter circuit 7. The selection circuit 21 outputs the digital data D_DATA when the selection pulse SEL is High and the selection pulse SELb is Low. On the other hand, the selection circuit 21 outputs the count signal from the counter circuit 7 when the selection pulse SEL is Low and the selection pulse SELb is High.

Figure 2:
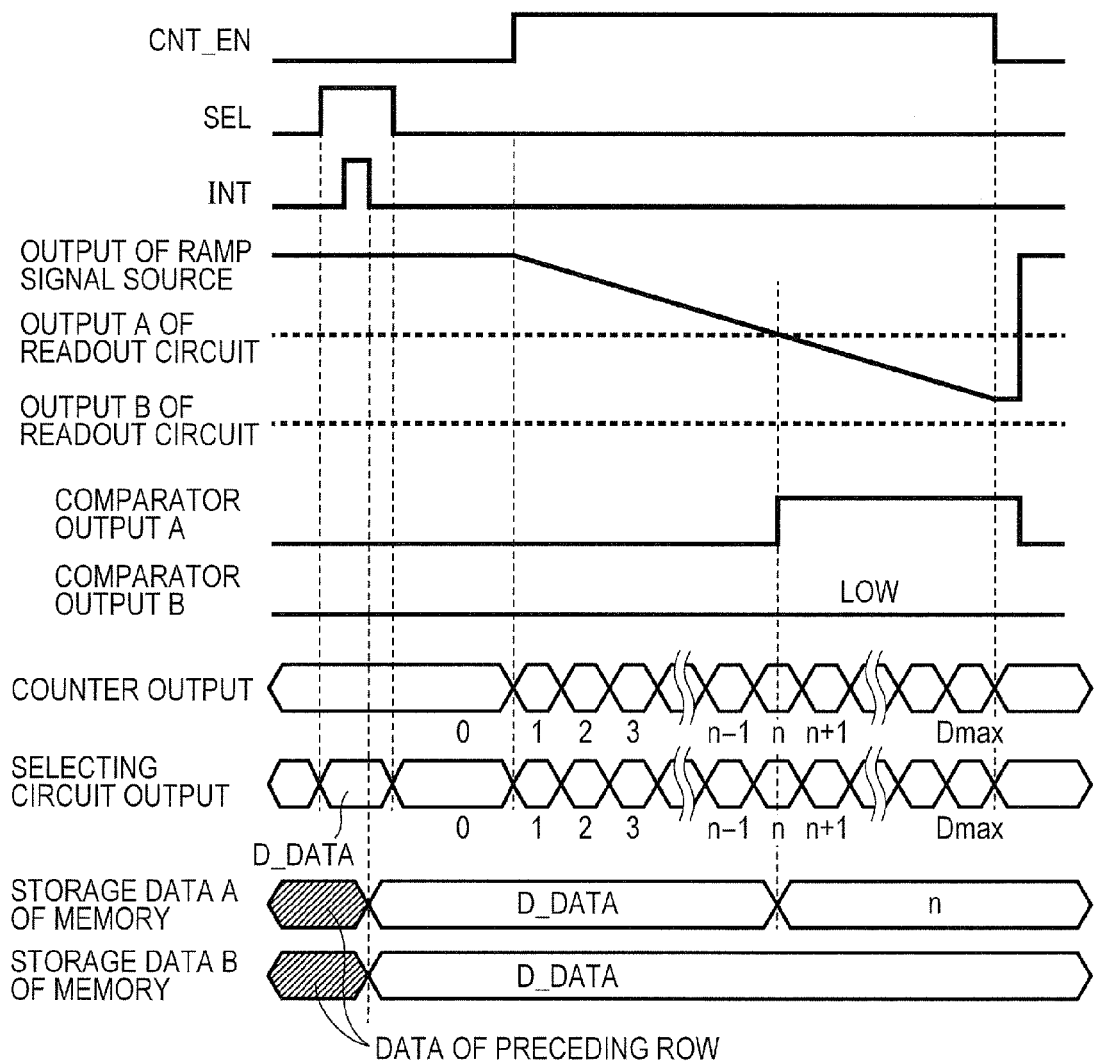
FIG. 2 is a timing chart illustrating an exemplary operation of the solid-state imaging apparatus.

Next, operations of the solid-state imaging apparatus according to the first embodiment (normal operation and overflow handling operation) will be described. FIG. 2 is a timing chart illustrating an exemplary operation of the solid-state imaging apparatus according to the first embodiment, describing operation corresponding to one pixel row.

First, the selection pulse SEL becomes High (the selection pulse SELb is Low). Consequently, the selection circuit 21 outputs the digital data D_DATA of a predetermined value. Next, with the selection pulse SEL remaining High, the write enable pulse INT is driven Low, High, and Low in this order. When the write enable pulse INT makes the High to Low transition, the memory 4 stores the output of the selection circuit 21, i.e., the digital data D_DATA.

Subsequently, the selection pulse SEL becomes Low (the selection pulse SELb is High). When the selection pulse SEL is Low, the selection circuit 21 selects and outputs the output of the counter circuit 7. However, while the counter operation enable pulse CNT_EN remains Low, the counter circuit 7 outputs a signal value of "0" as a count signal without performing a counting operation, and thus the selection circuit 21 outputs the value of "0."

Next, an analog/digital conversion period is started. Consequently, the counter operation enable pulse CNT_EN goes High and the counter circuit 7 starts a counting operation. Almost at the same time as the counter operation enable pulse CNT_EN changes from Low to High, the ramp signal source 6 generates and outputs a ramp signal. Incidentally, in FIG. 2, signals needed for operation of the ramp signal source 6, such as a signal needed to generate the ramp signal, are omitted.

As indicated by Output A of Read Out Circuit, the solid-state imaging apparatus operates as described below during normal operation in which the output potential of the read out circuit 2 is between upper and lower limits of electric potential of the ramp signal. When the electric potential of the ramp signal which is output from the ramp signal source 6 falls below the output potential of the read out circuit 2, the output of the comparator 3 makes a Low to High transition as indicated by Comparator Output A. The instant the output potential of the comparator 3 is reversed, the memory 4 stores the output of the selection circuit 21, i.e., the count signal which is output from the counter circuit 7, as digital data. For example, when the signal value of the count signal is n (n is digital data), if the output of the comparator 3 makes a Low to High transition, comparison is completed and the value n is written into the memory 4 (see Storage Data A in Memory shown in FIG. 2).

Next, description will be given of an overflow handling operation carried out when the output potential of the read out circuit 2 falls below the lower limit of the electric potential of the ramp signal as indicated by Output B of Read Out Circuit. When the output of the read out circuit 2 is as indicated by Output B of Read Out Circuit, since the electric potential of the ramp signal will never fall below the output potential of the read out circuit 2, the output of the comparator 3 remains Low as indicated by Comparator Output B. Therefore, the digital data in the memory 4 is not overwritten (renewed) and the value of the digital data D_DATA written in response to the write enable pulse INT is maintained (see Storage Data B in Memory shown in FIG. 2).

Upon the expiration of the predetermined analog/digital conversion period, the counter operation enable pulse CNT_EN goes Low. Consequently, the counter circuit 7 terminates the counting operation and the ramp signal source 6 terminates the generation of the ramp signal. According to the present embodiment, the digital data D_DATA is set to a maximum value Dmax of digital data available to an AD conversion process, i.e., the digital data output by the counter circuit 7 just before the counter operation enable pulse CNT_EN falls. Therefore, if the output of the read out circuit 2 is as shown in Output B of Read Out Circuit, digital data D_DATA=Dmax is held in the memory 4 as digital data corresponding to the output of the read out circuit 2 as shown in Storage Data B in Memory. On the other hand, in normal operation, digital data n resulting from AD conversion of the output of the read out circuit 2 is held in the memory 4 as indicated by Storage Data A in Memory.

According to the present embodiment, even if the output potential of the read out circuit 2 is lower than the ramp signal and the output of the comparator 3 is kept Low during an analog/digital conversion period, overflow handling can be performed by simple and easy timing control using a simplified circuit configuration. Also, the digital data D_DATA used for overflow handling can be processed directly as digital data of pixel signals if set to an appropriate value equal to or higher than Dmax. The present embodiment eliminates the need to provide carry bits such as conventional ones and enables reduction in circuit area.

Although according to the present embodiment, the memory 4 stores the output of the selection circuit 21 as digital data when the write enable pulse INT makes a High to Low transition, the present invention is not limited to this. For example, the output of the selection circuit 21 may be stored as digital data in the memory 4 when the write enable pulse INT makes a Low to High transition. Also, the value which is set as the digital data D_DATA may be variable.

Also, although according to the present embodiment, the ramp signal is a signal whose electric potential falls with time, the present invention is not limited to this. The ramp signal may be a signal whose electric potential rises with time. Although according to the present embodiment, the output of the comparator 3 is configured to become High when the electric potential of the ramp signal is higher than the output potential of the read out circuit, the present invention is not limited to this. The output of the comparator 3 may be configured to become Low when the electric potential of the ramp signal is higher than the output potential of the read out circuit. In either case, the output of the selection circuit 21 can be stored in the memory 4 upon reversal of the magnitude relationship between the electric potential of the ramp signal and the electric potential of the read out circuit.

Next, a second embodiment of the present invention will be described.

Figure 3:
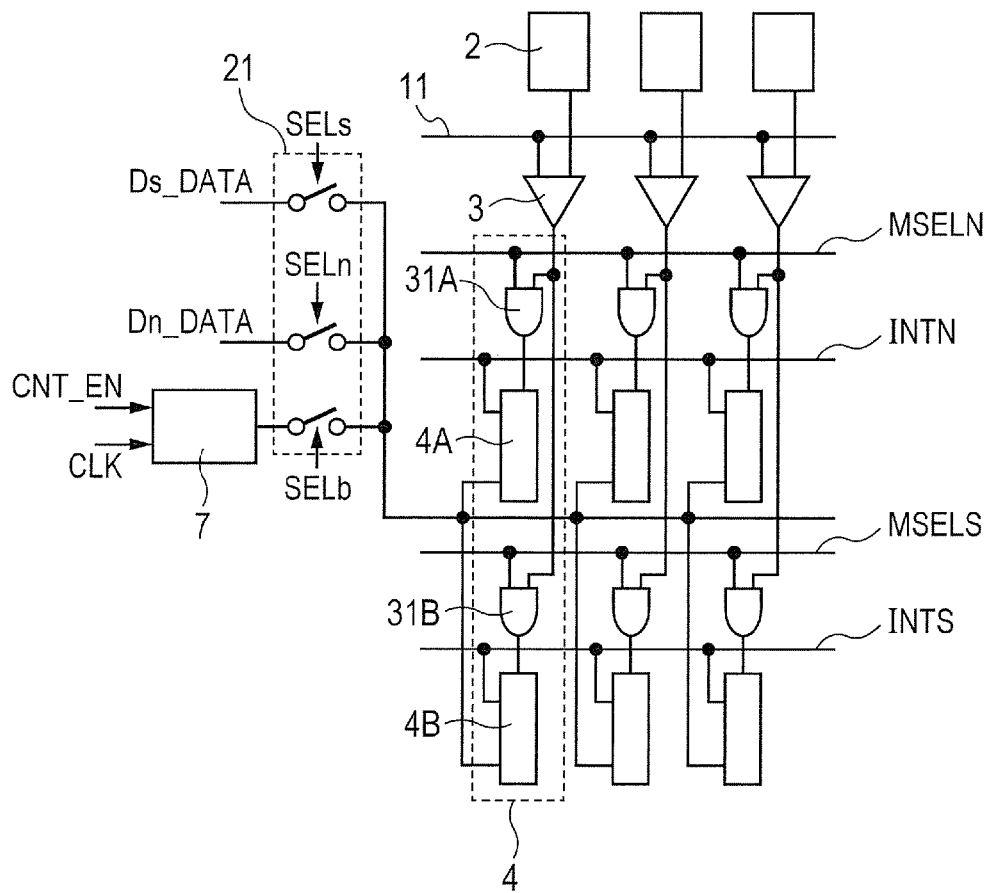
FIG. 3 is a diagram showing another exemplary configuration of a solid-state imaging apparatus.

FIG. 3 is a schematic diagram showing an exemplary circuit configuration of a solid-state imaging apparatus according to the second embodiment. In FIG. 3, components with the same functions as the components in FIG. 1 are denoted by the same reference numerals as the corresponding components in FIG. 1. In FIG. 3, the pixel unit 1, ramp signal source (reference signal generating circuit) 6, and the like not relevant to overflow handling according to the present embodiment are omitted from the illustration. In FIG. 3, the solid-state imaging apparatus includes a read out circuit 3, a comparator 3, a memory 4, a counter circuit 7, and a selection circuit 21.

The memory 4 includes a first memory element 4A adapted to store digital data (N data) resulting from AD conversion of signals at reset levels of pixels and a second memory element 4B adapted to store digital data (S data) resulting from AD conversion of pixel signals after photoelectric conversion.

The first memory element 4A accepts as input an output of a conjunction circuit (AND circuit) 31A, a write enable pulse INTN, and an output of the selection circuit 21. The AND circuit 31A accepts as input an output of the corresponding comparator 3 and a selection pulse MSELN and outputs the logical product of the comparator output and selection pulse MSELN. The first memory element 4A stores the output of the selection circuit 21 as digital data upon reversal of the output potential of the AND circuit 31A or upon a High to Low transition of the write enable pulse INTN.

The second memory element 4B accepts as input an output of an AND circuit 31B, a write enable pulse INTS, and an output of the selection circuit 21. The AND circuit 31B accepts as input an output of the corresponding comparator 3 and a selection pulse MSELS and outputs the logical product of the comparator output and selection pulse MSELS. The second memory element 4B stores the output of the selection circuit 21 as digital data upon reversal of the output potential of the AND circuit 31B or upon a High to Low transition of the write enable pulse INTS.

The selection circuit 21 accepts as input digital data Dn_DATA and Ds_DATA of predetermined values and an output of the counter circuit 7. Based on selection pulses SELn, SELs, and SELb, the selection circuit 21 can select which to output, the digital data Dn_DATA, the digital data Ds_DATA, or the count signal which is output from the counter circuit 7. When one of the selection pulses SELn and SELs is High, the other of the selection pulses SELn and SELs is Low. When both the selection pulses SELn and SELs are Low, the selection pulse SELb is High. Normally, the digital data Dn_DATA and digital data Ds_DATA differ in value from each other.

When the selection pulse SELn is High and the selection pulse SELs is Low, the selection circuit 21 outputs the digital data Dn_DATA. When the selection pulse SELs is High and the selection pulse SELn is Low, the selection circuit 21 outputs the digital data Ds_DATA. When both the selection pulses SELn and SELs are Low, i.e., when the selection pulse SELb is High, the selection circuit 21 outputs the count signal from the counter circuit 7.

Next, operations of the solid-state imaging apparatus according to the second embodiment (normal operation and overflow handling operation) will be described. FIG. 4 is a timing chart illustrating an exemplary operation of the solid-state imaging apparatus according to the second embodiment, describing operation corresponding to one pixel row. According to the present embodiment, both signals at reset levels of pixels and pixel signals after photoelectric conversion are subjected to an AD conversion process. Therefore, in FIG. 4, AD conversion is carried out twice and the period during which the counter operation enable pulse CNT_EN signal is High corresponds to an AD conversion period.

First, an AD conversion operation for a reset level signal will be described.

The selection pulse SELn becomes High (the selection pulses SELs and SELb are low). Consequently, the selection circuit 21 outputs the digital data Dn_DATA of a predetermined value for the reset level signal. Next, with the selection pulse SELn remaining High, the write enable pulse INTN is driven Low, High, and Low in this order. When the write enable pulse INTN makes the High to Low transition, the first memory element 4A of the memory 4 stores the output of the selection circuit 21, i.e., the digital data Dn_DATA.

Subsequently, the selection pulse SELn becomes Low. When both the selection pulses SELn and SELs are Low, the selection circuit 21 selects and outputs the output of the counter circuit 7. However, while the counter operation enable pulse CNT_EN remains Low, the counter circuit 7 outputs a signal value of "0" as a count signal without performing a counting operation, and thus the selection circuit 21 outputs the value of "0."

Next, the counter operation enable pulse CNT_EN goes High and the counter circuit 7 starts a counting operation. Almost at the same time as the counter operation enable pulse CNT_EN changes from Low to High, the ramp signal source generates and outputs a ramp signal.

As indicated by Output A of Read Out Circuit, the solid-state imaging apparatus operates as described below during normal operation in which the output potential of the read out circuit 2 is between upper and lower limits of electric potential of the ramp signal. When the electric potential of the ramp signal which is output from the ramp signal source 6 falls below the output potential of the read out circuit 2, the output of the comparator 3 makes a Low to High transition as indicated by Comparator Output A. At this time, the selection pulse MSELN is High. Therefore, when the output of the comparator 3 makes a Low to High transition, the output of the AND circuit 31A makes a Low to High transition. Upon the reversal of the output potential of the AND circuit 31A, the first memory element 4A stores the output of the selection circuit 21, i.e., the count signal which is output from the counter circuit 7, as digital data. For example, when the signal value of the count signal is n (n is digital data), if the output of the AND circuit 31A makes a Low to High transition, comparison related to the reset level signals is completed and the value n is written into the first memory element 4A (see Storage Data A in First Memory shown in FIG. 4).

Next, description will be given of an overflow handling operation carried out when the output potential of the read out circuit 2 falls below the lower limit of the electric potential of the ramp signal as indicated by Output B of Read Out Circuit. When the output of the read out circuit 2 is as indicated by Output B of Read Out Circuit, since the electric potential of the ramp signal will never fall below the output potential of the read out circuit 2, comparison is not completed and the output of the comparator 3 remains Low as indicated by Comparator Output B. Therefore, the digital data in the first memory element 4A is not overwritten (renewed) and the value of the digital data Dn_DATA written in response to the write enable pulse INTN is maintained (see Storage Data B in First Memory shown in FIG. 4).

Upon the expiration of a predetermined analog/digital conversion period for the reset level signals, the counter operation enable pulse CNT_EN goes Low. Consequently, the counter circuit 7 terminates the counting operation and the ramp signal source terminates the generation of the ramp signal. According to the present embodiment, the digital data Dn_DATA is set to a maximum value Dnmax of digital data available to an AD conversion process of the reset level signals. The digital data Dnmax corresponds to the digital data output by the counter circuit 7 just before the counter operation enable pulse CNT_EN falls during the analog/digital conversion period for the reset level signals. Therefore, when the output of the read out circuit 2 is as indicated by Output B of Read Out Circuit, digital data Dn_DATA=Dnmax is held in the first memory element 4A as digital data corresponding to the output of the read out circuit 2 as shown in Storage Data B in First Memory. On the other hand, in normal operation, digital data n resulting from AD conversion of the output of the read out circuit 2 is held in the first memory element 4A as indicated by Storage Data A in First Memory.

Next, an AD conversion operation for pixel signals after completion of the AD conversion operation for the reset level signals will be described. A transfer pulse PTX for the pixel signals becomes High and signals subjected to photoelectric conversion and accumulated in the pixels of the pixel unit according to light quantity are transferred to the read out circuit 2, which then outputs pixel signals according to the transferred signals. Then, the transfer pulse PTX for the pixel signals becomes Low and subsequently the selection pulse SELs becomes High (the selection pulses SELn and SELb are low). Consequently, during the period in which the selection pulse SELs is High, the selection circuit 21 outputs the digital data Ds_DATA of a predetermined value for the pixel signals. Next, with the selection pulse SELs remaining High, the write enable pulse INTS is driven Low, High, and Low in this order. When the write enable pulse INTS makes the High to Low transition, the second memory element 4B of the memory 4 stores the output of the selection circuit 21, i.e., the digital data Ds_DATA.

Subsequently, the selection pulse SELs becomes Low. When both the selection pulses SELn and SELs are Low, the selection circuit 21 selects and outputs the output of the counter circuit 7. However, since the counter operation enable pulse CNT_EN is Low, the selection circuit 21 outputs a value of "0."

Next, the counter operation enable pulse CNT_EN goes High and the counter circuit 7 starts a counting operation. Almost at the same time as the counter operation enable pulse CNT_EN changes from Low to High, the ramp signal source generates and outputs a ramp signal.

Although detailed description will be omitted because a similar process has already been described, under normal operation in which the output potential of the read out circuit 2 is such as shown in Output A of Read Out Circuit, the second memory element 4B outputs a count signal according to the output potential of the read out circuit 2 as digital data. That is, as indicated by Comparator Output A, upon a Low to High transition of the output of the comparator 3 (AND circuit 31B), the second memory element 4B stores the output of the selection circuit 21, i.e., the count signal which is output from the counter circuit 7, as digital data. For example, when the signal value of the count signal is s (s is digital data), the value s is written into the second memory element 4B (see Storage Data A of Second Memory shown in FIG. 4).

In the case of an overflow handling operation carried out when the output potential of the read out circuit 2 is such as shown in Output B of Read Out Circuit, since the electric potential of the ramp signal will never fall below the output potential of the read out circuit 2, the digital data in the second memory element 4B is not overwritten (updated). Therefore, the value of the digital data Ds_DATA written in response to the write enable pulse INTS is maintained in the second memory element 4B (see Storage Data B of Second Memory in FIG. 4).

Upon the expiration of a predetermined analog/digital conversion period for the pixel signals after photoelectric conversion, the counter operation enable pulse CNT_EN goes Low. Consequently, the counter circuit 7 terminates the counting operation and the ramp signal source terminates the generation of the ramp signal. According to the present embodiment, the digital data Ds_DATA is set to a maximum value Dsmax of digital data available to an AD conversion process of the pixel signals. The digital data Dsmax corresponds to the digital data output by the counter circuit 7 just before the counter operation enable pulse CNT_EN falls during the analog/digital conversion period for the pixel signals. Therefore, when the output of the read out circuit 2 is as indicated by Output B of Read Out Circuit, digital data Ds_DATA=Dsmax is held in the second memory element 4B as digital data corresponding to the output of the read out circuit 2 as shown in Storage Data B of Second Memory. On the other hand, in normal operation, digital data s resulting from AD conversion of the output of the read out circuit 2 is held in the second memory element 4B as indicated by Storage Data A of Second Memory.

After completion of the AD conversion operation for pixel signals, stored data is read serially out of the first memory element 4A and second memory element 4B on a column by column basis and the N data is subtracted from the S data. The subtraction allows the reset level signals to be subtracted from the pixel signals. Incidentally, a computing circuit which performs the subtraction and a processing circuit which gives a read command are omitted from the illustration in FIG. 3.

According to the present embodiment, even if the output potential of the read out circuit 2 is lower than the ramp signal and the output of the comparator 3 is kept Low, overflow handling for reset level signals and pixel signals can be performed by simple and easy timing control using a simplified circuit configuration. Also, the digital data Dn_DATA and Ds_DATA used for overflow handling can be processed directly as digital data of pixel signals if set to an appropriate value equal to or larger than a maximum available value. The present embodiment eliminates the need to provide carry bits such as conventional ones and enables reduction in circuit area.

Although according to the present embodiment, the first memory element 4A and second memory element 4B store the output of the selection circuit 21 as digital data when the respective write enable pulses INTS and INTS make a High to Low transition, the present invention is not limited to this. For example, the first memory element 4A and second memory element 4B may store the output of the selection circuit 21 as digital data when the respective write enable pulses INTS and INTS make a Low to High transition. Also, the values set as the digital data Dn_DATA and Ds_DATA may be variable.

Also, although according to the present embodiment, the ramp signal is a signal whose electric potential falls with time, the present invention is not limited to this. The ramp signal may be a signal whose electric potential rises with time. Although according to the present embodiment, the output of the comparator 3 is configured to become High when the electric potential of the ramp signal is higher than the output potential of the read out circuit, the present invention is not limited to this. The output of the comparator 3 may be configured to become Low when the electric potential of the ramp signal is higher than the output potential of the read out circuit. In either case, the output of the selection circuit 21 can be stored in the memory 4 upon reversal of the magnitude relationship between the electric potential of the ramp signal and electric potential of the read out circuit.

Although according to the first and second embodiments, the counter circuit 7 is connected in common to a plurality of memories 4, the present invention is not limited to this. For example, the counter circuit 7 may be provided for each column. However, the configuration in which the counter circuit 7 is connected in common to multiple columns of memories 4 eliminates the need to provide a selection circuit 21 for each column, saves the circuit area, and thereby provides a more marked effect.

It should be noted that the embodiments described above merely illustrate concrete examples of carrying out the invention and are not to be interpreted as limiting the true scope of the present invention. That is, the present invention can be implemented in various forms without departing from the technical idea or major features of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-192717, filed Sep. 5, 2011, which is hereby incorporated by reference herein in its entirety.

What is claimed is:

1. A solid-state imaging apparatus, comprising:
   a plurality of pixels arranged two-dimensionally in a matrix, and each outputting a pixel signal;
   a reference signal generating circuit configured to generate a reference signal that changes a signal level monotonously with time;
   a plurality of comparators each arranged corresponding to each of columns of the plurality of pixels, and configured to compare the pixel signal with the reference signal;
   a plurality of memories arranged each correspondingly to each of the plurality of comparators;
   a counter starting a counting operation according to an output of the reference signal from the reference signal generating circuit, configured to count clock pulses to generate a count signal and configured to supply the count signal to the plurality of memories; and
   a data supplying unit configured to supply digital data of a predetermined value to the plurality of memories before the comparing, the predetermined value being a value indicating a saturation level of the pixel signal, configured to not renew the digital data from the predetermined value when an output of the comparator does not change as a result of the comparing, and configured to renew the digital data from the predetermined value into a signal value of the count signal when an output of the comparator changes as a result of the comparing.

2. The solid-state imaging apparatus according to claim 1, further comprising a selecting circuit configured to supply to the plurality of memories either of the digital data of the predetermined value and the signal value of the count signal.

3. The solid-state imaging apparatus according to claim 1, wherein each of the plurality of the memories comprises a first memory element configured to store digital data derived by analog-to-digital conversion of a reset level signal of the pixel, and a second memory element configured to store digital data derived by analog-to-digital conversion of a signal generated by photoelectric conversion of a light incident in the pixel and outputted from the pixel.

4. The solid-state imaging apparatus according to claim 3, wherein the data supplying unit is configured to supply the digital data to the first memory, and configured to supply the digital data of the predetermined value different from the predetermined value of the digital data supplied to the first memory.

5. The solid-state imaging apparatus according to claim 1, wherein the predetermined value of the digital data supplied by the data supplying unit is variable.

6. The solid-state imaging apparatus according to claim 1, wherein the predetermined value of the digital data supplied by the data supplying unit is larger than or equal to a maximum value in an output range of the digital data derived by analog-to-digital conversion of the pixel signal.

7. A method of driving a solid-state imaging apparatus, comprising:
- a plurality of pixels arranged two-dimensionally in a matrix, and each pixel configured to output a pixel signal;
- a reference signal generating circuit configured to generate a reference signal that changes a signal level monotonously with time;
- a plurality of comparators each arranged corresponding to each of columns of the plurality of pixels, and configured to compare the pixel signal with the reference signal;
- a plurality of memories arranged each correspondingly to each of the plurality of comparators; and
- a counter starting a counting operation according to an output of the reference signal from the reference signal generating circuit, configured to count clock pulses to generate a count signal and configured to supply the count signal to the plurality of memories, the method comprising steps of:
- writing digital data of the predetermined value to the plurality of memories before the comparing, the predetermined value being a value indicating a saturation level of the pixel signal, and
- renewing the digital data from the predetermined value into a signal value of the count signal when an output of the comparator changes as a result of the comparing, and not renewing the digital data from the predetermined value when an output of the comparator does not change as a result of the comparing.

8. The method according to claim 7, wherein
each of the plurality of the memories comprises a first memory element configured to store digital data derived by analog-to-digital conversion of a reset level signal of the pixel, and a second memory element configured to store digital data derived by analog-to-digital conversion of a signal generated by photoelectric conversion of a light incident in the pixel and outputted from the pixel,
the method further comprising steps of:
supplying the digital data of the predetermined value to the first memory element; and
supplying the digital data of the predetermined value different from the predetermined value of the digital data supplied to the first memory element.

9. The solid-state imaging apparatus according to claim 1, wherein the predetermined value of the digital data supplied by the data supplying unit is a value of the count signal at a timing of finishing the reference signal changes the signal level monotonously with time.

10. The method according to claim 7, wherein the predetermined value is larger than or equal to a maximum value in an output range of the digital data derived by analog-to-digital conversion of the pixel signal.

11. The method according to claim 7, wherein the predetermined value is a value of the count signal at a timing of finishing the reference signal changes the signal level monotonously with time.

* * * * *